United States Patent
Gosi de Aquino et al.

(10) Patent No.: US 11,204,111 B2
(45) Date of Patent: Dec. 21, 2021

(54) METHOD FOR PRODUCING A PIPE LINED WITH AN INNER LINER

(71) Applicant: Evonik Operations GmbH, Essen (DE)

(72) Inventors: Fábio Gosi de Aquino, Düsseldorf (DE); Markus Hartmann, Sendenhorst (DE); Daniel Demicoli, Essen (DE); Rainer Göring, Borken (DE); Hermann van Laak, Hünxe (DE); Horst Beyer, Marl (DE); Lan de Gans Li, Mülheim an der Ruhr (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/756,169

(22) PCT Filed: Oct. 24, 2018

(86) PCT No.: PCT/EP2018/079144
§ 371 (c)(1),
(2) Date: Apr. 15, 2020

(87) PCT Pub. No.: WO2019/081572
PCT Pub. Date: May 2, 2019

(65) Prior Publication Data
US 2020/0248844 A1    Aug. 6, 2020

(30) Foreign Application Priority Data

Oct. 25, 2017    (EP) .................................... 17198320

(51) Int. Cl.
| | | |
|---|---|---|
| *F16L 9/147* | (2006.01) | |
| *B32B 1/08* | (2006.01) | |
| *B32B 7/12* | (2006.01) | |
| *B32B 15/08* | (2006.01) | |
| *B32B 37/12* | (2006.01) | |
| *F16L 58/10* | (2006.01) | |

(52) U.S. Cl.
CPC ............... *F16L 9/147* (2013.01); *B32B 1/08* (2013.01); *B32B 7/12* (2013.01); *B32B 15/08* (2013.01); *B32B 37/12* (2013.01); *F16L 58/1009* (2013.01); *B32B 2597/00* (2013.01)

(58) Field of Classification Search
CPC .............. F16L 19/147; F16L 58/1009; F16L 2597/00; B32B 1/08; B32B 7/12; B32B 15/08; B32B 37/12; B32B 2597/00
USPC ................................................ 138/141, 150
See application file for complete search history.

(56) References Cited

U.S. PATENT DOCUMENTS

| | | |
|---|---|---|
| 4,356,300 A | 10/1982 | Isler et al. |
| 4,970,257 A | 11/1990 | Schmidt et al. |
| 5,242,992 A | 9/1993 | Poll et al. |
| 5,258,470 A | 11/1993 | Poll et al. |
| 5,629,062 A * | 5/1997 | Ejiri .......................... B32B 1/08 428/36.9 |
| 5,836,357 A * | 11/1998 | Kittson ................. B29C 53/382 138/98 |
| 6,131,618 A | 10/2000 | Brundy et al. |
| 7,025,842 B2 | 4/2006 | Monsheimer et al. |
| 7,374,127 B2 * | 5/2008 | Gallagher ........... F16L 55/1652 242/438 |
| 7,939,151 B2 | 5/2011 | Kuhmann et al. |
| 8,303,873 B2 | 11/2012 | Dowe et al. |
| 8,399,658 B2 | 3/2013 | Hengstermann et al. |
| 8,524,342 B2 | 9/2013 | Haeger et al. |
| 8,580,899 B2 | 11/2013 | Dowe et al. |

(Continued)

FOREIGN PATENT DOCUMENTS

| | | |
|---|---|---|
| DE | 3006961 A1 | 8/1980 |
| DE | 3023214 A1 | 3/1982 |

(Continued)

OTHER PUBLICATIONS

German International Search Report dated Jan. 3, 2019 in PCT/EP2018/079144 (4 pages).

(Continued)

*Primary Examiner* — Craig M Schneider
*Assistant Examiner* — David R Deal
(74) *Attorney, Agent, or Firm* — Taylor English Duma LLP; Philip P. McCann

(57) ABSTRACT

A pipe, the inner surface of which is lined with a thermoplastic layer, is produced by a process comprising the following steps:
a) a metal pipe is provided,
b) a tubular inliner composed of a thermoplastic material is provided,
c) a tape is cohesively helically bonded to the inliner, wherein the region of the contact surface of the tape consists of a moulding composition or an adhesive which adhere firmly to the surface of the inliner, and wherein the region of the opposing surface of the tape consists of a moulding composition or an adhesive which adhere firmly to the metal of the pipe, wherein the tape contains unidirectional reinforcing fibers;
d) the cross section of the inliner is optionally reduced by exposure to an external force,
e) the inliner is inserted into the metal pipe,
f) by means of contact pressure and optionally heat, the inliner and metal pipe are firmly bonded to each other.

Relative movements between the metal pipe and inliner are thereby prevented; the inliner also has high safety against collapse. The pipe is used to produce a routed pipeline.

20 Claims, 1 Drawing Sheet

(56) References Cited

U.S. PATENT DOCUMENTS

| | | | |
|---|---|---|---|
| 8,647,551 B2 | 2/2014 | Dowe et al. | |
| 8,679,270 B2 | 3/2014 | Dowe et al. | |
| 8,999,086 B2 | 4/2015 | Bollmann et al. | |
| 9,114,567 B2 | 8/2015 | Monsheimer et al. | |
| 9,133,965 B2 | 9/2015 | Goering et al. | |
| 9,151,418 B2 | 10/2015 | Goering et al. | |
| 9,278,898 B2 | 3/2016 | Cameretti et al. | |
| 9,309,998 B2 | 4/2016 | Kuhmann et al. | |
| 9,310,014 B2* | 4/2016 | Ekelund | B29C 63/10 |
| 9,314,989 B2 | 4/2016 | Kuhmann et al. | |
| 9,315,443 B2 | 4/2016 | Erhardt et al. | |
| 9,382,181 B2 | 7/2016 | Cameretti et al. | |
| 9,429,264 B2 | 8/2016 | Berger et al. | |
| 9,556,358 B2 | 1/2017 | Berger et al. | |
| 9,574,700 B2 | 2/2017 | Dowe et al. | |
| 9,919,494 B2 | 3/2018 | Franosch et al. | |
| 9,982,410 B2 | 5/2018 | Hartmann et al. | |
| 10,071,951 B2 | 9/2018 | Erhardt et al. | |
| 10,072,786 B2 | 9/2018 | Dowe et al. | |
| 10,094,505 B2 | 10/2018 | Goering et al. | |
| 10,113,671 B2 | 10/2018 | Franosch et al. | |
| 10,139,022 B2 | 11/2018 | Goering et al. | |
| 10,252,498 B2 | 4/2019 | Berger et al. | |
| 10,288,208 B2 | 5/2019 | Berger et al. | |
| 10,427,390 B2 | 10/2019 | Berger et al. | |
| 10,436,350 B1* | 10/2019 | Ehsani | F16L 1/038 |
| 10,464,296 B2 | 11/2019 | Berger et al. | |
| 10,816,113 B2 | 10/2020 | Berger et al. | |
| 2003/0124281 A1 | 7/2003 | Ries et al. | |
| 2003/0234056 A1* | 12/2003 | Woolstencroft | B32B 27/02 |
| | | | 138/98 |
| 2004/0140668 A1 | 7/2004 | Monsheimer et al. | |
| 2005/0038201 A1 | 2/2005 | Wursche et al. | |
| 2008/0217821 A1 | 9/2008 | Goring et al. | |
| 2009/0044906 A1 | 2/2009 | Goring et al. | |
| 2009/0107553 A1* | 4/2009 | Hayes | B32B 25/08 |
| | | | 137/1 |
| 2009/0308475 A1* | 12/2009 | Stringfellow | F16L 11/12 |
| | | | 138/98 |
| 2010/0009106 A1 | 1/2010 | Dowe et al. | |
| 2011/0174410 A1* | 7/2011 | Li | F16L 11/085 |
| | | | 138/141 |
| 2011/0274923 A1 | 11/2011 | Hartmann et al. | |
| 2012/0175004 A1* | 7/2012 | Kiest, Jr. | F16L 55/179 |
| | | | 138/98 |
| 2012/0199317 A1 | 8/2012 | Hartmann et al. | |
| 2012/0232531 A1 | 9/2012 | Goering et al. | |
| 2013/0025734 A1 | 1/2013 | Kuhmann et al. | |
| 2013/0032240 A1 | 2/2013 | Kuhmann et al. | |
| 2013/0065000 A1* | 3/2013 | Smillie | B32B 27/12 |
| | | | 428/35.3 |
| 2016/0271918 A1 | 9/2016 | Berger et al. | |
| 2016/0271920 A1 | 9/2016 | Franosch et al. | |
| 2018/0195646 A1 | 7/2018 | Berger et al. | |
| 2018/0195647 A1* | 7/2018 | Berger | B32B 5/12 |

FOREIGN PATENT DOCUMENTS

| | | |
|---|---|---|
| EP | 0296852 A2 | 12/1988 |
| EP | 0377486 A2 | 7/1990 |
| EP | 0434244 A2 | 6/1991 |
| EP | 0450975 A2 | 10/1991 |
| EP | 0514142 A2 | 11/1992 |
| EP | 0562706 A2 | 9/1993 |
| EP | 0619451 A1 | 10/1994 |
| EP | 2558273 A1 | 2/2013 |
| EP | 2783835 A1 | 10/2014 |
| EP | 3 069 876 A1 | 9/2016 |
| JP | 06322346 A | 11/1994 |
| WO | 95/27168 A1 | 10/1995 |
| WO | 96/37725 A1 | 11/1996 |
| WO | 98/02293 A1 | 1/1998 |
| WO | 01/16520 A1 | 3/2001 |
| WO | 2007/023253 A1 | 3/2007 |
| WO | 2011/042732 A1 | 4/2011 |
| WO | 2011/128237 A1 | 10/2011 |
| WO | 2012/118379 A1 | 9/2012 |
| WO | 2020/058403 A1 | 3/2020 |

OTHER PUBLICATIONS

International Search Report dated Jan. 3, 2019 in PCT/EP2018/079144 (2 pages).

Written Opinion dated Jan. 3, 2019 in PCT/EP2018/079144 (7 pages).

* cited by examiner

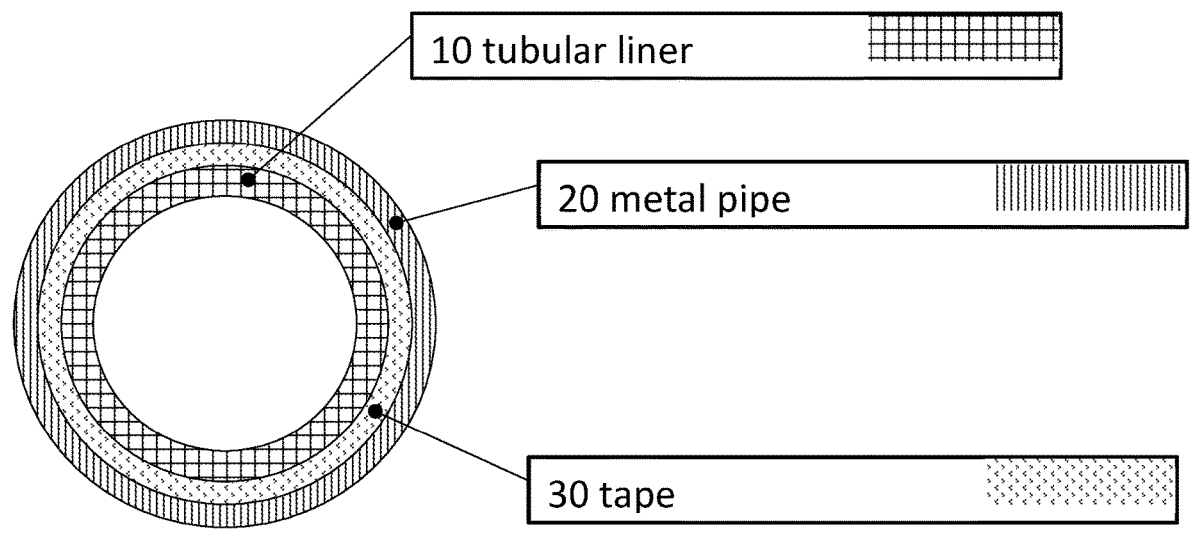

ved in the conveyed fluids such as small molecules, including but not limited to $CO_2$.

METHOD FOR PRODUCING A PIPE LINED WITH AN INNER LINER

CROSS REFERENCE TO RELATED APPLICATIONS

This application is a 35 U.S.C. § 371 U.S. national phase entry of International Application No. PCT/EP2018/079144 having an international filing date of Oct. 24, 2018, which claims the benefit of EP Application No. 17198320.8 filed Oct. 25, 2017, each of which is incorporated herein by reference in its entirety.

FIELD

The invention relates to a process for producing a pipe, the inner surface of which is lined with a thermoplastic layer. It also relates to the pipe thus produced, the use thereof for producing a routed pipeline and also the pipeline thus produced. The pipeline is especially a metal pipeline which serves for the transport of wastewater, gas, oil, crude oil, refined products, water-oil mixtures, sand-water-oil mixtures, slurries in the mining sector or similar fluids, for reinforcing and lining an oil or gas production well or as drilling column during borehole construction in oil or gas fields.

BACKGROUND

Wastewater pipelines, oil or gas pipelines or pipelines which transport similar fluids, have a limited lifetime. The cause of this is firstly progressive corrosion damage and secondly sustained mechanical stresses which occur during transport of abrasive fluids. The pipelines concerned are generally at a depth of about 1 m or more on land or underwater in seas and lakes such that replacement of the pipes would be possible only at considerable cost. Metallic pipelines are frequently also used for stabilizing and lining boreholes in oil and gas fields. These pipelines, referred to as casings by those skilled in the art, are also exposed to conditions that are highly corrosive, and also sometimes abrasive. Furthermore, metallic pipelines are also frequently used as drilling columns during borehole construction on land. These boreholes serve to provide access to sources of oil, gas or even water. The drilling column guides the drill head during drilling on land. The column in this case is often a pipe with a cross section that permits passage of process fluids and also of the first recovery fluids. Again, these pipelines are exposed to highly corrosive and sometimes abrasive fluids. Therefore, there is a need for pipelines that are resistant to corrosion and abrasion.

The pipelines concerned are often equipped with a liner at the factory or, for example, on what are known as spool-bases. This serves, inter alia, to prevent damage by corrosion. Oil-conveying pipelines are assembled, for example, onshore prior to placing in the sea, on what are known as spoolbases and equipped with a liner. In addition, pipelines for casings of boreholes are also provided with a liner at the factory for example and are then inserted into the borehole.

Suitable processes for inserting an overdimensioned inliner into a pipe or a pipeline are described, for example, in the following patent applications: EP 0 562 706 A2, EP 0 619 451 A1, WO 95/27168, WO 98/02293, WO 01/16520, WO 2007/023253, EP 0 377 486 A2, EP 0 450 975 A2, EP 0 514 142 A2 and WO 96/37725.

The external diameter of the pipe inliner here is designed to be somewhat larger than that of the pipe to be lined. In order to insert the inliner, the cross section thereof is then reduced by stretching, compression or folding. After inserting the inliner, recovery forces cause it to come into contact with the inner wall of the pipe. This procedure can be assisted by applying pressure and heat. The pipe thus lined has no annular space. Due to irregularities of the pipe or pipeline inner surface, which may be caused by surface roughness for example but also by welds, microscopic cavities however remain.

A suitable insertion process is Swagelining™ for example. Once inliner pipes have been butt-welded here to give a section which is somewhat longer than the section of the carrier pipe to be renovated, the inliner section is drawn through a swage which temporarily reduces the pipe diameter. This therefore allows the inliner to be pulled into the smaller interior pipe space within the carrier pipe. Once all of the inliner has been pulled into the pipeline, the tensile force is relieved. Due to the recovery behavior of the thermoplastic material, the inliner strives to regain its initial diameter until it abuts firmly to the inner wall of the pipeline. High wall friction between inliner and pipeline results therefrom which leads to positional stabilization of the inliner and, for example, prevents any longitudinal expansion induced by fluid swelling or the effect of heat in excess of the expansion of the pipeline. In addition, the inliner fits so tightly to the pipe inner surface that the resultant volume within the annular space is very small.

A further suitable insertion process is the Rolldown® process. Also here, inliner pipes are initially attached in situ by the butt-welding process. In order to permit insertion, the cross section of the inliner is reduced in the Rolldown machine with the aid of rollers arranged in pairs. The speed of the deformation is typically one to three metres per minute. After insertion, the pipe ends are sealed and the inliner is pressurized using water pressure. As a result, it expands again to its original diameter and abuts tightly to the pipe inner wall. Compared to Swagelining, lower tensile forces are required here during insertion of the inliner which results in lower material stress and permits higher insertion speeds.

The inliner can also already be inserted at the factory by these methods.

Folding is described, for example, in EP 0 377 486 A2.

WO 2011/042732 describes another process for inserting inliners having larger or the same diameter as the carrier pipeline. It is explained therein how an inliner can be inserted in short pipe sections. In this case, the inliner is inserted into the carrier pipe through a swage.

The insertion processes described above are suitable for liners made of thermoplastic materials to line pipes which serve to transport district heating, fresh water, wastewater, gas, oil, crude oil or similar fluids, to reinforce and line oil and gas production wells or as drilling columns during borehole drilling in oil and gas fields.

A disadvantage in all the processes described is that gases can permeate through the inliner. Gas therefore enters the cavities and/or microcavities located between the inliner and the carrier pipeline. The gas pressure is in equilibrium with the partial pressure of the gas in the conveyed fluid. In the event of pressure fluctuations in the line, the gas located in the annular space can expand; in the worst case the gas can here occupy a volume which can lead to radial folding of the liner. This folding results in blockage of the cross section of the carrier pipe and in the worst case means that fluid can no longer pass through. This failure, known to those skilled in the art as collapse, is the predominant type of failure of inliners. This phenomenon is especially critical when conveying or transporting crude oil or natural gas or when transporting supercritical $CO_2$, especially under conditions in which relatively rapid pressure changes are likely to occur. In the oil and gas industries, such pressure changes are a phenomenon known by the term "rapid gas decompression" (RGD).

Methods of handling such pressure changes are therefore required in tertiary mineral oil extraction for example. Tertiary oil extraction methods use supercritical $CO_2$ as solvent for residual oil in which its viscosity is reduced and extraction from the oil-bearing strata is facilitated. For $CO_2$, the critical temperature is 31° C. and the critical pressure is 73.8 bar. In practice, significantly higher pressures are used since the dissolution capacity of supercritical $CO_2$ increases with pressure. Typical pressures are in the range of 75 to 220 bar, wherein the temperature can be up to 150° C.

The pipes which transport supercritical $CO_2$ are often equipped with a polymeric inliner in order to protect the usually metallic structure from corrosion. In transport pipes, the liner typically consists of polyethylene; it can however also consist of a polyamide or of PVDF for example.

Rapid pressure changes can also occur during the operation of crude oil pipelines and gas pipelines, for example if the line is depressurized for the purpose of maintenance work and in this case a rapid pressure reduction takes place. In the event of an emergency shutdown, a rapid pressure reduction may also occur in such conveying, collection or transport pipelines.

SUMMARY

In order to prevent detachment of the inliner from the metal pipe 10 and collapse of the inliner as a result, processes are known in which the inliner is glued into the metal pipe 10. For instance, JP 06322346A thus describes an inliner which can be glued into a steel pipe with the aid of a hot-melt adhesive. Another approach is disclosed in EP 2 783 835 A1; here an inliner is inserted into a metal pipe 10 and is associated with the metal through melting by heating the pipe externally.

BRIEF DESCRIPTION OF THE DRAWINGS

FIG. 1 shows a cross section of the present inventimon including the metal pipe, tubular liner and tape.

DETAILED DESCRIPTION

EP 2 783 835 A1 describes that the inliner may also consist of two, three or more layers. For this purpose, the outer layer of the inliner can be adhesion-modified in order to achieve a firm bonding to the carrier pipe. For instance, the bonding of an inliner composed of a polyolefin to the carrier pipe can be optimized such that the inliner consists of an inner polyolefin layer and a subsequent outer layer consists of a functionalized polyolefin. In addition, the adhesion of an inliner consisting of a polyamide moulding composition may be optimized by such an outer layer composed of a functionalized polyolefin. In this document, different exemplary layer sequences are subsequently mentioned. Multilayer plastic pipes of this kind have been known for many years from the field of fuel pipes for motor vehicles. However, the extrusion systems available for the purpose are designed for pipes having small diameters, i.e. for diameters of much less than 50 mm and generally for diameters of 6 to 12 mm. For applications in the oil and gas sector, however, much greater diameters are required—according to the application, customary internal diameters are from 1 to 10 inches (25.4 to 254 mm). However, systems that can produce these diameters are usually available only for the production of single-layer pipes. Retrofitting of existing multilayer systems for high diameters or retrofitting of existing monolayer pipe systems for multilayer large pipes is associated with high time demands and costs, and in some cases is barely possible owing to the space required.

The object of the invention consists of avoiding the disadvantages outlined and of providing a process which on the one hand has the good properties of the liner technologies typically used and on the other hand eliminates cavities and microcavities such that the difficulties described above no longer occur.

This object is achieved by a process for producing a metal pipe 10, the inner surface of which is lined with a thermoplastic layer, wherein the process comprises the following steps:

a) a metal pipe 10 is provided; this is also referred to below as carrier pipe, b) a tubular inliner 20 composed of a thermoplastic material is provided, c) a tape 30 is cohesively helically bonded to the tubular inliner 20, wherein the region of the contact surface of the tape 30 consists of a moulding composition or an adhesive which adheres firmly to the surface of the inliner, and wherein the region of the opposing surface of the tape 30 consists of a moulding composition or an adhesive which adheres firmly to the metal of the carrier pipe, wherein the tape 30 contains unidirectional reinforcing fibers;

d) the cross section of the inliner is optionally reduced by exposure to an external force, e) the inliner is inserted into the carrier pipe, f) by means of contact pressure and optionally heat, the inliner and carrier pipe are firmly bonded to each other.

In this context, two embodiments are generally possible.

In the first embodiment, the external diameter of the inliner is slightly larger than the internal diameter of the pipe. The difference of the two diameters is at least an infinitesimally small value. Typically, the external diameter of the inliner is at most 25% and preferably at most 20% larger than the internal diameter of the pipe. Here in process step d), the cross section of the inliner is generally reduced by 3 to 30% and preferably by 5 to 25%. This may be achieved, for example, by stretching, compression or folding in accordance with the prior art.

In the second embodiment, the external diameter of the inliner corresponds to the internal diameter of the pipe or it is slightly smaller, for example up to a maximum of 3%, such that the inliner can be inserted into the pipe with low forces ("close fit design"). If necessary, prior to insertion of the inliner, its cross section can also be reduced here by exposure to an external force; this can be significantly lower however than is the case in the first embodiment. The respective pipe geometries are selected such that the radially thermal expansion of the polymeric inliner during exposure to heat is greater than that of the pipe, and thus the inliner comes into close contact and the necessary contact pressure is generated. The latter can be enhanced by applying an internal pressure, for example by compressed air; in this manner the geometric fixing can take place during process step f). However, the polymeric inliner can also be equipped with a memory effect, directly after the extrusion process, which results in an enlarged external diameter after exposure to heat and subsequent cooling. For this purpose, the polymeric inliner is drawn through a die in a subsequent process step and is thus subjected to cold-forming (stretched longitudinally and reduced in diameter). This deforming process is carried out at temperatures below $T_g$, so that the stretching is reversed on heating the inliner above $T_g$. This process is suitable particularly for polymeric materials having a high $T_g$, for polyarylene ether ketones for example, in order to ensure good storage stability of these polymeric liners pretreated in this way.

"Pipe" is understood here to mean in the narrower sense a transportable section; several such pipes are assembled to produce a pipeline. This process is particularly suitable for pipe lengths between 1 m and 50 m, these then being bonded during installation to give longer pipelines, for example by means of screw threads, flanges, compression sleeves, welds etc.

The pipe is preferably composed of metal, for example of steel, stainless steel, copper, of aluminium, of cast iron, galvanized steel, cadmium-plated steel, of aluminium-coated metal, steel coated with metal alloys, an example being GALFAN, or of any other metal. It is particularly preferable that the interior surface of the pipe is composed of steel, of zinc or of an alloy with the main constituent aluminium, iron or zinc.

Suitable materials for the inliner are thermoplastic moulding compositions, for example based on polyamides, polyolefins, fluoropolymers, polyarylene ether ketones or polyphenylene sulfide. The expression "based on" signifies here and in general below that the moulding composition is composed of the relevant polymers to an extent of at least 50% by weight, preferably to an extent of at least 60% by weight, particularly preferably to an extent of at least 70% by weight, more preferably to an extent of at least 80% by weight, and especially preferably to an extent of at least 85% by weight or at least 90% by weight.

The polyamide that may be used in accordance with the invention can be produced from a combination of diamine and dicarboxylic acid, from an w-aminocarboxylic acid or from the corresponding lactam. In principle, any polyamide can be used, for example PA46, PA6, PA66 or copolyamides on this basis with units deriving from terephthalic acid and/or from isophthalic acid. In one preferred embodiment, the monomer units comprise on average at least 8, at least 9, or at least 10 carbon atoms. In the case of mixtures of lactams it is the arithmetic average that is considered here. For a combination of diamine and dicarboxylic acid the arithmetic average of the number of carbon atoms from diamine and dicarboxylic acid in this preferred embodiment must be at least 8, at least 9 or at least 10. Examples of suitable polyamides include: PA610 (which can be produced from hexamethylenediamine [6 carbon atoms] and sebacic acid [10 carbon atoms], the average number of carbon atoms in the monomer units here therefore being 8), PA88 (which can be produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. Semiaromatic polyamides moreover have good suitability, for example PA66/6T, PA6/6T, PA6T/MPMDT (MPMD meaning 2-methylpentamethylenediamine), PA9T, PA10T, PA11T, PA12T, PA14T and copolycondensates of these latter types with an aliphatic diamine and an aliphatic dicarboxylic acid or with an w aminocarboxylic acid or a lactam. The production of the polyamides is prior art. It will be appreciated that it is also possible to employ copolyamides based on these substances and that optional co-use of monomers such as caprolactam is also possible.

The polyamide may also be a polyetheresteramide or a polyetheramide. Polyetheramides are known in principle from DE-OS 30 06 961 for example. They comprise a polyetherdiamine as comonomer. Suitable polyetherdiamines are obtainable by conversion of the corresponding polyetherdiols by reductive amination or coupling to acrylonitrile with subsequent hydrogenation (e.g. EP-A-0 434 244; EP-A-0 296 852). Said polyetherdiamines generally have a number-average molar mass of from 230 to 4000 and are generally present in the polyetheramide in a fraction of preferably from 5 to 50 wt %.

Commercially available polyether diamines derived from propylene glycol are commercially available from Huntsman as the ELASTAMIN® series. Also very suitable in principle are polyetherdiamines derived from 1,4-butanediol or 1,3-butanediol or polyetherdiamines of mixed structure for instance with random or with blockwise distribution of the units originating from the diols.

It is likewise possible to use mixtures of different polyamides provided that they are sufficiently compatible. Compatible polyamide combinations are known to those skilled in the art or can be determined by routine experimentation.

One possible embodiment uses a mixture of 30 to 99% by weight, particularly preferably 40 to 98% by weight and especially preferably 50 to 96% by weight of polyamide in the narrower sense and 1 to 70% by weight, particularly preferably 2 to 60% by weight and especially preferably 4 to 50% by weight of polyetheresteramide and/or polyetheramide. Polyetheramides are preferred here.

The polyolefin is, for example, polyethylene (PE) or polypropylene (PP). In principle it is possible to use any commercially available type. It is therefore possible by way of example to use: high-, medium- or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers and more of the like. The polyolefin can be produced by any known process, for example by a Ziegler-Natta process, by the Phillips process, by use of metallocenes or by a free-radical route.

The fluoropolymer may be, for example, a polyvinylidene fluoride (PVDF), an ethylene-tetrafluoroethylene copolymer (ETFE), an ETFE modified with the aid of a tertiary component, for example propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA). Also useful are copolymers based on vinylidene fluoride that include up to 40% by weight of other monomers, for example trifluoroethylene, chlorotrifluoroethylene, ethylene, propene and hexafluoropropene.

The polyarylene ether ketone comprises units of the formulae

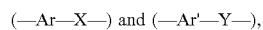

where Ar and Ar' represent a divalent aromatic radical, preferably 1,4-phenylene, 4,4'-biphenylene or else 1,4-, 1,5- or 2,6-naphthylene. X is an electron-withdrawing group, preferably carbonyl or sulfonyl, while Y is another group such as O, S, CH$_2$, isopropylidene or the like. At least 50%, preferably at least 70% and particularly preferably at least 80%, of the groups X here are a carbonyl group, while at least 50%, preferably at least 70% and particularly preferably at least 80%, of the groups Y are composed of oxygen.

In the preferred embodiment, 100% of the groups X are composed of carbonyl groups and 100% of the groups Y are composed of oxygen. In this embodiment the polyarylene ether ketone can by way of example be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups are naturally also possible.

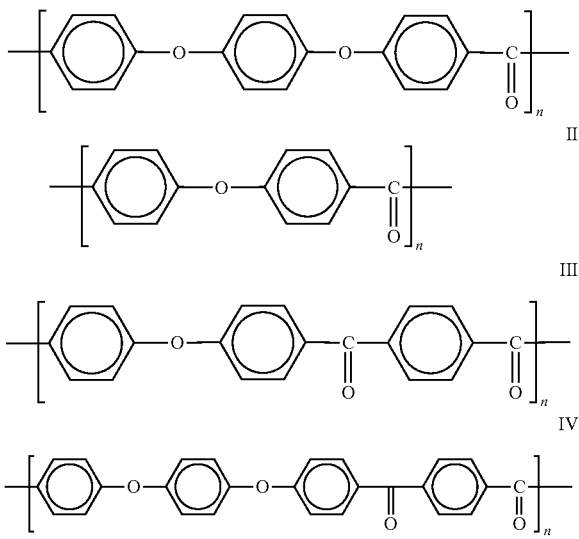

The polyarylene ether ketone is semicrystalline, and this is apparent by way of example in DSC analysis by the presence of a crystallite melting point $T_m$, which in most cases, in terms of order of magnitude, is around 300° C. or thereabove.

The polyphenylene sulfide comprises units of the formula

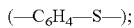

It is preferable that it is composed of at least 50% by weight, at least 70% by weight or at least 90% by weight of said units. The remaining units can be those stated above in the case of the polyarylene ether ketone, or tri- or tetrafunctional branching-agent units which result from the concomitant use by way of example of trichlorobenzene or tetrachlorobenzene during synthesis. Polyphenylene sulfide is available commercially in a wide variety of types or moulding compositions.

The moulding composition can comprise the conventional auxiliaries and additives, and optionally further polymers, examples in the case of the polyarylene ether ketone being fluoropolymers such as PFA, polyimide, polyetherimide, LCP such as liquid-crystalline polyester, polysulfone, polyether sulfone, polyphenyl sulfone, polybenzimidazole (PBI) or other polymers with high temperature resistance, in the case of the polyphenylene sulfide by way of example copolymers and, respectively, terpolymers of ethylene with polar comonomers, and in the case of the polyamide an impact modifier. The usual additives can moreover be present, examples being plasticizers, pigments, fibrous reinforcement materials, processing aids and stabilizers. The proportion of polyarylene ether ketone, polyphenylene sulfide, polyamide, polyolefin or fluoropolymer in the moulding composition is at least 50% by weight, preferably at least 60% by weight, particularly preferably at least 70% by weight, with particular preference at least 80% by weight and especially preferably at least 90% by weight. It is preferable that the moulding composition comprises no second polymer component which forms a separate phase.

The internal diameter of the carrier pipe is generally up to 2000 mm, preferably up to 1000 mm and particularly preferably up to 500 mm, wherein the lower limit of the internal diameter is 20 mm, preferably 30 mm and particularly preferably 40 mm. The wall thickness of the inliner here is in the range from 1 to 100 mm, preferably in the range from 1.5 to 80 mm and more preferably in the range from 2 to 70 mm.

The inliner is preferably produced by extrusion of a thermoplastic moulding composition to give continuous pipes; these are then cut into appropriate sections.

Suitable materials for the tape 30 are moulding compositions preferably based on semicrystalline polymers, for example olefinic polymers, polyamides, fluoropolymers, polyarylene ether ketones or polyphenylene sulfide. In this context, the tape 30 may have a single layer or also multiple layers, for example two, three or four layers. The tape 30 may comprise in this context, on the side facing the inliner and/or on the side facing the metal pipe 10, a layer composed of an adherent moulding composition or an adhesive. The tape 30 layer which is provided for bonding to the carrier pipe, and optionally the layer which is provided for bonding to the inliner, may consist of a pressure-sensitive adhesive or a crosslinking adhesive for example. Adhesives relevant for the process according to the invention are, for example, epoxy resin adhesives, polyurethane adhesives, phenol resin adhesives, polyester resin adhesives (especially those having reactive end groups such as isocyanate end groups), polyamide hot-melt adhesives, cyanoacrylate adhesives, polysulfide adhesives, light curing adhesives and anaerobically curing adhesives. The latter harden under exclusion of air and metal catalysis and are therefore particularly suitable for bonding between the outer tape 30 surface and carrier pipe. In order to facilitate handling, an adhesive layer may be covered with a detachable protective film.

Some exemplary embodiments of the tape 30 will be described hereinafter.

In the case of an inliner composed of a polyamide moulding composition, the tape 30 can be a single layer. By way of example, it then consists of a moulding composition based on a maleic anhydride-functionalized polyethylene or polypropylene, of a polyether amide or of a polyamide, which comprises adhesion-modifying additives such as are described in paragraph [0033] of EP2783835A1.

The tape 30 here may also have two layers. For instance, it may be composed of a layer of a moulding composition based on polyamide or functionalized polyolefin, which bears a layer composed of an epoxy resin adhesive on the side which is provided for bonding to the polyamide inliner.

Furthermore, the tape 30 here may also have three layers. For instance, it may be composed of a layer of a moulding composition based on polyamide or functionalized polyolefin, which on both sides bears a layer of an epoxy resin adhesive or, as an alternative, a layer of an epoxy resin adhesive on the side which is provided for bonding to the polyamide inliner, and a layer of an anaerobically curing adhesive on the side which is provided for bonding to the metal pipe 10.

In the case of an inliner composed of a polyethylene or polypropylene moulding composition, the tape 30 can have a single layer. It then consists by way of example of a moulding composition based on a maleic anhydride-functionalized polyethylene or polypropylene.

The tape 30 here may also have two layers. For instance, it may be composed of a layer of a moulding composition based on functionalized polyethylene or polypropylene, which bears a layer composed of an epoxy resin adhesive or an anaerobically curing adhesive on the side which is provided for bonding to the metal pipe 10.

Furthermore, the tape 30 here may also have three layers. For instance, it may be composed of a layer of a moulding composition based on functionalized polyethylene or polypropylene, which bears a layer of a non-functionalized polyethylene or polypropylene on the side which is provided for bonding to the polyolefin inliner, and a layer of an epoxy resin adhesive or an anaerobically curing adhesive on the side which is provided for bonding to the metal pipe 10.

The width of the tape 30 is dependent on the pipe diameter. Typical widths are in the range from about 20 mm to about 700 mm and preferably in the range from about 30 mm to about 500 mm. The thickness of the tape 30 is limited and as a result it must be sufficiently mechanically stable on the one hand and sufficiently flexible on the other hand in order that it can be readily coiled. In practice, the tape 30 therefore typically has a thickness in the range of 0.05 mm to 3 mm and preferably in the range of 0.1 mm to 2 mm.

The cross section of the tape 30 can be rectangular. There may also be recesses on the sides such that the overlapping regions interlock and an essentially smooth surface is presented to the winding.

The tape 30 is wound in a spiral fashion on the inliner under tension, thus is attached to the base by friction by means of the contact pressure. It is to be noted in this context that the tape 30 is wound edge to edge in order to cover the outer surface of the inliner substantially seamlessly and preferably practically completely seamlessly; overlaps and gaps are to be avoided if possible. The winding angle in principle plays no role as long as a crease-free winding of the tape 30 layer is possible. The winding is effected under a contact pressure which is generated by the winding tension or by a pressing apparatus.

In order to increase the tensile strength of the tape 30, one tape 30 layer or two or more tape 30 layers comprises unidirectional reinforcing fibers. The tape 30 preferably comprises from 3 to 20% by volume, preferably from 5 to 19% by volume and particularly preferably from 10 to 18% by volume of reinforcing fibers, based on the volume of the tape 30. A specific embodiment thereof is a tape 30 composed of three or more layers where the middle layer (in the case of a three-layer tape 30) or at least one of the middle layers (in the case of a tape 30 composed of more than three layers) comprises unidirectional reinforcing fibers. In this case, the fiber content is preferably in the range from 3 to 40% by volume, more preferably from 10 to 38% by volume and particularly preferably from 20 to 36% by volume based on the volume of the fiber-reinforced tape 30 layer. The unidirectional reinforcing fibers are generally oriented in axial direction of the tape 30. The fibers of the one or more tape 30 layers are preferably continuous fibers.

In principle, all fibers of sufficient length are suitable, the softening temperature and thermal resistance of which is above the processing temperature of the matrix moulding composition; inorganic fibers, polymer fibers and natural fibers and also combinations with one another may be used. Examples of suitable fibers are metal fibers, glass fibers, preferably glass fibers composed of S1 glass, S2 glass, carbon fibers, metallized carbon fibers, boron fibers, ceramic fibers (e.g. composed of $Al_2O_3$ or $SiO_2$), basalt fibers, silicon carbide fibers, potassium titanate fibers, aramid fibers, fibers composed of liquid crystalline polyesters, polyacrylonitrile fibers and also fibers composed of polymers such as polyimide, polyetherimide, polyphenylene sulfide, poly-p-phenylene benzobisoxazole (PBO), polyether ketone, polyether ether ketone and the like. The cross section of the fibers can be, for example, circular, rectangular, oval, elliptical or cocoon-shaped. With fibers of cross section deviating from the circular shape (for example flat glass fibers), it is possible to achieve a higher fill level of fiber in the finished part, and thus higher strength. Commercially available fibers usually comprise a size on their surface which provides functional groups for binding to a polymer matrix. For the purpose of the invention, a size may be helpful, but it is not in principle required. Preference is given to using fibers having a size, more preferably the size is reactive to the polymer matrix.

The bonding between the inliner and tape 30 can be generated either by pressure alone, optionally in combination with a crosslinking reaction, or by means of thermal welding. In the case of welding of inliner and tape 30, it is preferable that both contact surfaces are melted. In one embodiment, the two contact surfaces are initially melted, for example by means of infrared radiation, hot air, hot gas, laser radiation, microwave radiation, or directly by contact heating. The contact surfaces that have been melted are then pressed against one another, for example with the aid of the winding tension or by means of a contact body, for instance of a roller or of a jaw. The contact pressure should then be maintained until the molten regions have solidified. In a further possible embodiment, the tape 30 is wound up and then melted from the outside, either indirectly or else directly by means of a heatable contact body. Thereafter, the contact pressure is maintained until the regions melted have solidified. This process can be conducted with the aid of a winding station and subsequently a downstream consolidation station, as described, for example, in WO 2012/118379.

The inliner is inserted into the carrier pipe in a known manner, for example according to the prior art as outlined above.

The bonding between inliner and carrier pipe can also be generated either by pressure alone, optionally in combination with a crosslinking reaction, or by means of thermal welding. The pressure may be generated by the recovery force, the thermal expansion of the inliner or an internal pressure applied externally by water or air pressure. In the case of thermal welding, the pipe is heated externally or internally, in which any industrially suitable process may be used. For example, the carrier pipe or the inliner is heated by hot air, hot steam, electromagnetic induction or IR radiation. In this case, the temperature used should preferably be at least 10 K, particularly preferably at least 20 K, more preferably at least 30 K and especially preferably at least 40 K above the melting temperature of the material of the outer surface of the tape 30 applied. Melting temperature means the crystallite melting point $T_m$ of the moulding composition, determined in accordance with ISO 11357 on the second heating, or the softening point of a non-crystalline material. It is generally recommended to maintain the temperature for at least 10 s, preferably for at least 20 s, particularly preferably for at least 30 s and especially preferably for at least 40 s.

If the pipe is now heated to a temperature above the softening or melting range of the material of the outer surface of the tape 30 applied, the outer surface of the tape 30 melts and the contact pressure, which is generated either by the recovery force, the thermal expansion of the inliner or an internal pressure applied externally, leads to a pressing of the melt into the microcavities between the tape 30 applied and the pipe. The annular space is thereby eliminated. Permeating gas can no longer accumulate and therefore collapse of the inliner can no longer occur on pressure fluctuations in the fluid conveyed.

The temperature is then reduced. In this case, the pipe can be cooled, for example in a natural manner, preferably by an airlock and particularly preferably by water cooling. It must be cooled sufficiently such that the outer surface of the applied tape 30 once more solidifies. It is typically cooled to ambient temperature.

After cooling, a grip remains between the material of the tape 30 applied and the pipe material and also an adhesion. Therefore, as further advantage, relative movements between inliner and carrier pipe are also prevented.

Due to the high mechanical strength, the good abrasion properties, the good scratch resistance and also the optimal thickness of the inserted inliner, both a good corrosion protection and a good abrasion protection can be ensured at the same time in accordance with the invention. The very smooth inner surface of the polymeric inliner also ensures a very low flow resistance, which reduces the energy required for the conveying process (particularly the pump power); at the same time it ensures a reduction of deposits or contaminants on the inner wall, for example of waxes, salts or biofilms. At the same time, the risk that the inliner collapses on pressure fluctuations is eliminated by the process according to the invention. For this reason, the pipeline produced by the pipes according to the invention can be used to particular advantage for conveying or transporting crude oil or natural gas or transporting supercritical $CO_2$, especially under conditions in which relatively rapid pressure changes are likely to occur.

The invention claimed is:

1. A process for producing a metal pipe, an inner surface of which is lined with a thermoplastic layer, wherein the process comprises the following steps:
    a) a metal pipe is provided;
    b) a tubular polymeric inliner composed of a thermoplastic material is provided;
    c) a tape is cohesively helically bonded to the tubular polymeric inliner, wherein a region of a contact surface of the tape consists of a moulding composition or an adhesive which adhere firmly to a surface of the tubular polymeric inliner, and wherein a region of an opposing surface of the tape consists of a moulding composition or an adhesive which adhere firmly to the metal of the pipe,
       wherein the tape unidirectionally contains reinforcing fibers,
       wherein the tape comprises from 3 to 20% by volume of reinforcing fibers based on a volume of the tape;
    d) a cross section of the tubular polymeric inliner is optionally reduced by exposure to an external force;
    e) the tubular polymeric inliner is inserted into the metal pipe;
    f) by means of contact pressure and optionally heat, the tubular polymeric inliner and metal pipe are firmly bonded to each other.

2. The process according to claim 1, wherein the tubular polymeric inliner consists of a moulding composition consisting to an extent of at least 50% by weight of poly amide, poly olefin, fluoropolymer, polyarylene ether ketone or polyphenylene sulfide.

3. The process according to claim 2, wherein the tape consists of one to four layers.

4. The process according to claim 3, wherein at least one layer of the tape consists of a moulding composition consisting to an extent of at least 50% by weight of polyolefin, polyamide, fluoropolymer, polyarylene ether ketone or polyphenylene sulfide.

5. The process according to claim 4, wherein the tape on a side facing the tubular polymeric inliner comprises a layer composed of an adherent moulding composition or an adhesive.

6. The process according to claim 4, wherein the tape on a side facing the metal pipe comprises a layer composed of an adherent moulding composition or an adhesive.

7. The process according to claim 6, wherein the adhesive is selected from the group consisting of pressure-sensitive adhesive, epoxy resin adhesive, polyurethane adhesive, phenol resin adhesive, polyester resin adhesive, poly amide hot-melt adhesive, cyanoacrylate adhesive, polysulfide adhesive, light curing adhesive and anaerobically curing adhesive.

8. A pipe produced according to claim 2.

9. The process according to claim 1, wherein
    the tape consists of from one to four layers.

10. The process according to claim 9, wherein
    at least one layer of the tape consists of a moulding composition consisting to an extent of at least 50% by weight of poly olefin, poly amide, fluoropolymer, polyarylene ether ketone or polyphenylene sulfide.

11. The process according to claim 9, wherein
    the tape on a side facing the tubular polymeric inliner comprises a layer composed of an adherent moulding composition or an adhesive.

12. The process according to claim 11, wherein
    the adhesive is selected from a group consisting of pressure-sensitive adhesive, epoxy resin adhesive, polyurethane adhesive, phenol resin adhesive, polyester resin adhesive, polyamide hot-melt adhesive, cyanoacrylate adhesive, polysulfide adhesive, light curing adhesive and anaerobically curing adhesive.

13. The process according to claim 9, wherein
    the tape on a side facing the metal pipe comprises a layer composed of an adherent moulding composition or an adhesive.

14. A pipe produced according to claim 1.

15. A routed pipeline comprising the pipe according to claim 14.

16. The routed pipeline produced using a pipe according to claim 15,
    wherein
    in the mining sector the routed pipeline serves for the transport of wastewater, gas, oil, crude oil, refined products, water-oil mixtures, sand-water-oil mixtures or slurries.

17. The routed pipeline produced using a pipe according to claim 15, wherein
    the routed pipeline serves to reinforce and line an oil or gas production well.

18. Pipeline produced using a pipe according to claim 15, wherein
    the routed pipeline serves as drilling column during borehole construction in oil or gas fields.

19. Pipeline produced using a pipe according to claim 15, wherein
the routed pipeline is a conveying pipe, a collecting pipe or a transportation pipe for crude oil or natural gas.

20. Pipeline produced using a pipe according to claim 15, wherein
the routed pipeline is a pipe for supercritical CO2.

* * * * *